United States Patent
Uematsu et al.

(10) Patent No.: US 10,648,503 B2
(45) Date of Patent: May 12, 2020

(54) THRUST BEARING AND BEARING DEVICE

(71) Applicants: TOYOTA JIDOSHA KABUSHIKI KAISHA, Toyota-shi, Aichi-ken (JP); TAIHO KOGYO CO., LTD., Toyota-shi, Aichi-ken (JP)

(72) Inventors: Yuta Uematsu, Toyota (JP); Takashi Koyama, Mishima (JP); Tsutomu Kubota, Toyota (JP); Tadashi Namba, Toyota (JP)

(73) Assignees: Toyota Jidosha Kabushiki Kaisha, Toyota-shi, Aichi-ken (JP); Taiho Kogyo Co., Ltd., Toyota-shi, Aichi-ken (JP)

( * ) Notice: Subject to any disclaimer, the term of this patent is extended or adjusted under 35 U.S.C. 154(b) by 0 days.

(21) Appl. No.: 16/216,084

(22) Filed: Dec. 11, 2018

(65) Prior Publication Data
US 2019/0186533 A1 Jun. 20, 2019

(30) Foreign Application Priority Data
Dec. 18, 2017 (JP) .................. 2017-241792

(51) Int. Cl.
*F16C 17/04* (2006.01)
*F16C 33/10* (2006.01)
(Continued)

(52) U.S. Cl.
CPC .......... *F16C 17/047* (2013.01); *F01D 25/168* (2013.01); *F16C 9/02* (2013.01);
(Continued)

(58) Field of Classification Search
CPC ........ F16C 9/02; F16C 17/022; F16C 17/047; F16C 33/1065; F16C 33/1075;
(Continued)

(56) References Cited

U.S. PATENT DOCUMENTS 4,348,065 A * 9/1982 Yoshioka ............ F16C 33/1075
384/121
5,520,466 A * 5/1996 Everitt .................... F16C 17/10
384/124

(Continued)

FOREIGN PATENT DOCUMENTS

| JP | 2008-542657 A | 11/2008 |
| JP | 2014-202295   | 10/2014 |
| JP | 2017-172607 A | 9/2017  |

*Primary Examiner* — Marcus Charles
(74) *Attorney, Agent, or Firm* — Finnegan, Henderson, Farabow, Garrett & Dunner, LLP

(57) ABSTRACT

A slide surface of a thrust bearing includes a planar portion, a taper portion, and a pocket portion. The pocket portion includes a bottom surface, a first side surface, and a second side surface. The first side surface is formed on the side of the taper portion. The second side surface is formed on a side opposed to the first side surface. A depth from the plane of the planar portion to the thinnest portion of the taper portion is between 10 μm and 80 μm. A first angle that is an angle between a virtual surface obtained by extending the bottom surface and the second side surface is between 90° and 120°. And a second angle that is an angle between a virtual surface obtained by extending the first side surface and the tapered surface is between 60° and 120°.

7 Claims, 8 Drawing Sheets

(51) Int. Cl.
*F16C 9/02* (2006.01)
*F01D 25/16* (2006.01)

(52) U.S. Cl.
CPC .......... *F16C 17/04* (2013.01); *F16C 33/1065* (2013.01); *F16C 33/1075* (2013.01); *F16C 2240/30* (2013.01); *F16C 2240/42* (2013.01)

(58) Field of Classification Search
CPC .............. F16C 2360/24; F16C 2360/22; F16C 2240/30; F16C 2240/42; F01D 25/162; F01D 25/168; F04D 29/0513
USPC ................ 384/107, 112–114, 121, 123, 129, 384/275–276, 284, 305, 429, 288, 384/294–296; 388/288, 294–296
See application file for complete search history.

(56) References Cited

U.S. PATENT DOCUMENTS

| | | | | |
|---|---|---|---|---|
| 5,829,338 A * | 11/1998 | Chrestoff | ................ | F04B 1/148 92/12.2 |
| 5,951,169 A * | 9/1999 | Oklejas | ............... | F16C 33/1065 384/123 |
| 6,132,094 A * | 10/2000 | Cornelison | ............. | F16C 17/04 384/121 |
| 6,921,210 B2 * | 7/2005 | Welch | ....................... | F16C 9/02 384/123 |
| 6,976,788 B2 * | 12/2005 | Honda | ................ | F16C 33/1065 384/123 |
| 7,354,199 B2 * | 4/2008 | Welch | ....................... | F16C 9/00 384/275 |
| 7,470,064 B2 * | 12/2008 | Link | ..................... | F01D 25/168 384/121 |
| 9,188,159 B2 * | 11/2015 | Tanaka | ................ | F16C 33/046 |
| 9,746,023 B2 * | 8/2017 | George | ..................... | F16C 9/02 |
| 2006/0274982 A1 | 12/2006 | Welch et al. | | |
| 2014/0233873 A1 * | 8/2014 | Hayashi | ................ | F16C 17/047 384/123 |

* cited by examiner

THRUST BEARING AND BEARING DEVICE

FIELD

The present disclosure relates to a structure of a thrust bearing and a bearing device that receives an axial force of a crankshaft.

BACKGROUND

Conventionally, a thrust bearing which receives an axial force of a crankshaft for an internal combustion engine is known. For example, JP 2014-202295 A proposes a semi-circular thrust bearing having a half-split ring shaped. The thrust bearing has a slide surface and an inverse wedge surface on one side. The slide surface supports a crankshaft in an axial direction. The inverse wedge surface is formed so that a wall thickness decreases toward a rotation direction of the crankshaft.

SUMMARY

The inverse wedge surface described above is a tapered surface configured to expand the bearing clearance toward the sliding direction of the crankshaft. Lubricating oil is attracted to such a tapered surface due to the generated negative pressure. In the slide surface where negative pressure is generated, a phenomenon called cavitation occurs, in which the air dissolved in the lubricating oil becomes bubbles. When cavitation occurs, the effect of reducing the sliding friction loss by reducing the shear resistance of the fluid can be obtained.

However, the thrust bearing with such a tapered surface has the problem of attracting foreign matter to the slide surface together with lubricating oil. In the conventional thrust bearing, foreign matter mixed in the lubricating oil is discharged to the outside of the bearing through a clearance formed by the reverse wedge surface. However, in the opinion of the inventors of the present disclosure, since negative pressure occurs in such an inverse wedge surface, foreign matter is not necessarily discharged smoothly. As described above, the thrust bearing with a tapered surface where negative pressure is generated, it is desirable to efficiently discharge foreign matter attracted together with lubricating oil while reducing sliding friction loss.

The present disclosure is made to solve the problem as described above, and has an object to provide a thrust bearing and a bearing device, which can reduce sliding friction loss while improving discharging efficiency of foreign matter.

In order to attain the above described object, a first disclosure is a thrust bearing having a slide surface in a circular ring shape or a half-split circular ring shape. The slide surface of the thrust bearing includes a planar portion, a taper portion, and a pocket portion. The planar portion has a plane on the slide surface where a wall thickness is constant. The taper portion has a tapered surface on the slide surface where a wall thickness gradually decreases from an end portion of the planar portion toward a prescribed sliding direction. The pocket portion includes a bottom surface, a first side surface, and a second side surface. In the bottom surface, a wall thickness is thinner than a thinnest portion of the taper portion. The first side surface is formed on the side of the taper portion. The second side surface is formed on a side opposed to the first side surface. The planar portion, the taper portion and the pocket portion are disposed in order along the sliding direction on the slide surface. A depth from the plane of the planar portion to the thinnest portion of the taper portion is between 10 μm and 80 μm. A first angle that is an angle between a virtual surface obtained by extending the bottom surface and the second side surface is between 90° and 120°. And a second angle that is an angle between a virtual surface obtained by extending the first side surface and the tapered surface is between 60° and 120°.

A second disclosure has the following feature in addition to the first disclosure. A plurality of structures including the planar portion, the taper portion and the pocket portion may be disposed continuously on the slide surface.

A Third disclosure has the following feature in addition to the first or the second disclosure. A depth from the plane of the planar portion to the bottom surface of the pocket portion may be 0.1 mm or more.

A fourth disclosure has the following feature in addition to any one of the first to third disclosures. The thrust bearing may be configured as a flange bearing configured to be integrated with a sliding bearing that receives a force in a radial direction of a shaft.

A fifth disclosure is a bearing device configured to support a crankshaft of an internal combustion engine. The device includes a bearing support portion, and the thrust bearing described in the first disclosure. The bearing support portion has a bearing hole and a bearing seat around the bearing hole and supporting a journal of the crankshaft by the bearing hole. The thrust bearing is disposed on the bearing seat in such a direction that a rotation direction of the crankshaft coincides with a prescribed sliding direction of the thrust bearing.

According to the first disclosure, the planar portion generates a squeeze effect, the taper portion generates cavitation, and the pocket portion exerts the trapping effect of foreign matter. The foreign matter attracted by the negative pressure to the taper portion is captured in the pocket portion. The second side surface exerts a function to capture foreign matter to the pocket portion by generating fluid turning loss. This turning loss increases as the first angle of the first angle of the pocket portion increases. In the first disclosure, by determining the first angle to be between 90° and 120°, it is possible to suppress the foreign matter captured by the pocket portion from flowing to the planar portion.

The first side surface also demonstrates the function of attracting foreign matter by generating negative pressure at the pocket portion and the function of preventing return of foreign matter by creating turbulent flow inside the pocket portion. The negative pressure generated in the pocket portion becomes smaller as the second angle becomes larger and the turbulent flow generated in the pocket portion becomes larger as the second angle becomes larger. In the first disclosure, by determining the second angle to be between 60° and 120°, it is possible to achieve both of the function of attracting the foreign matter into the pocket portion and the function of preventing return of the foreign matter.

According to the second disclosure, the squeeze effect, the occurrence of cavitation, and the trapping effect of foreign matter can be exerted in a balanced manner in the slide surface.

The maximum size of foreign matter attracted into the tapered surface is about 0.1 mm. According to the third disclosure, it is possible to prevent biting of foreign matter when the foreign matter having the maximum size is captured in the pocket portion.

According to the fourth disclosure, the thrust bearing is configured as the flange bearing integrally formed with the sliding bearing. According to the present disclosure, the number of parts can be reduced.

According to the fifth disclosure, the thrust bearing is disposed in such a direction that the rotation direction of the crankshaft coincides with the prescribed sliding direction. According to the bearing device of the present disclosure, foreign matter dischargeability can be improved while reducing sliding friction loss with the crankshaft.

DESCRIPTION OF EMBODIMENT

Hereinafter, an embodiment of the present disclosure will be described with reference to the drawings. Note that when the numerals of the numbers, the quantities, the amounts, the ranges and the like of the respective elements are mentioned in the embodiment shown as follows, the present disclosure is not limited to the mentioned numerals unless specially explicitly described otherwise, or unless the disclosure is explicitly specified by the numerals theoretically. Further, the structures that are described in the embodiment shown as follows are not always indispensable to the disclosure unless specially explicitly shown otherwise, or unless the disclosure is explicitly specified by the structures theoretically.

First Embodiment

Hereinafter, a first embodiment of the present disclosure will be described with reference to the drawings.

1. Configuration of First Embodiment

Figure 1:
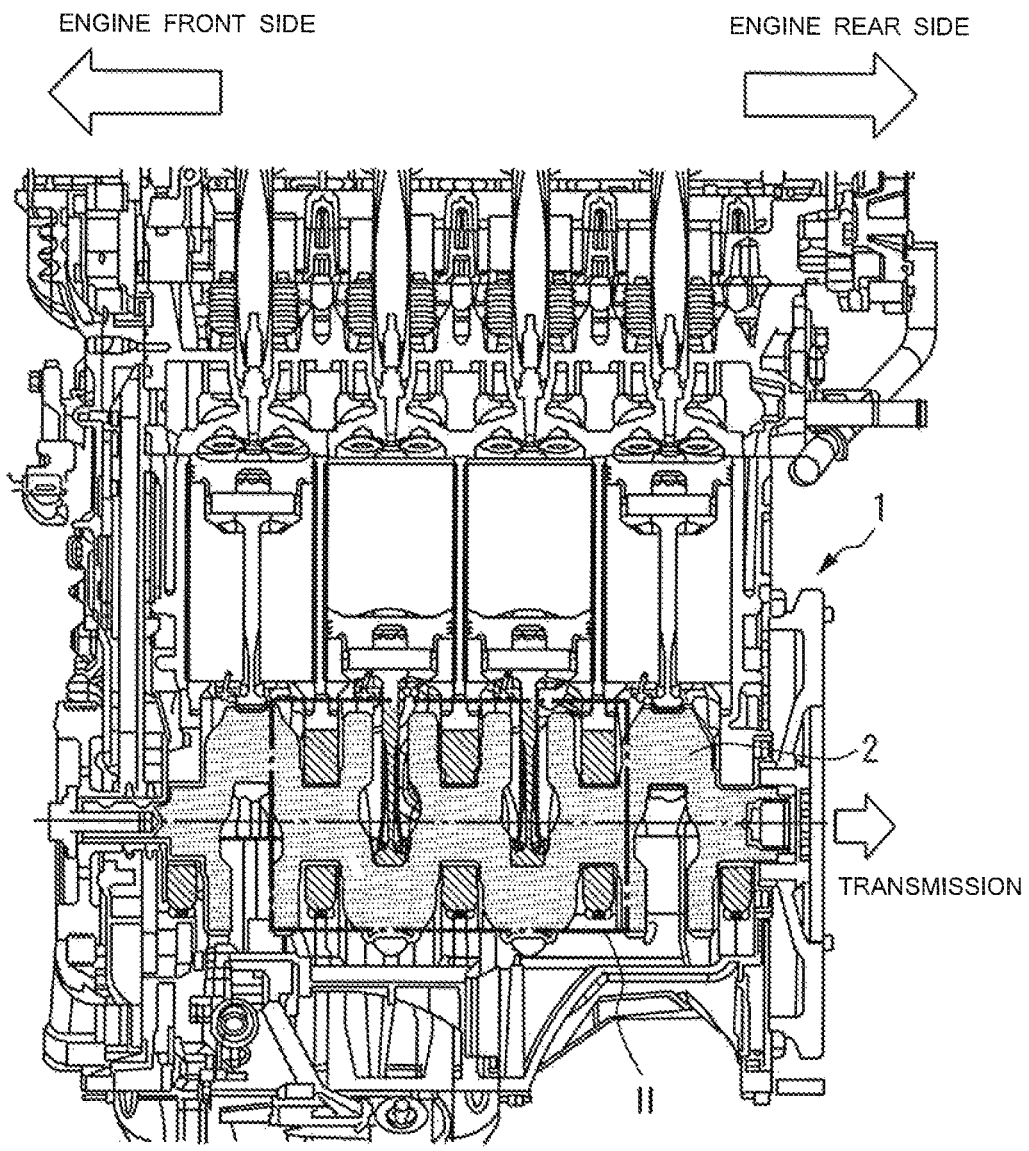
FIG. 1 is a view of an engine main body of an internal combustion engine to which a bearing device for a crankshaft according to a first embodiment of the present disclosure is adopted.

FIG. 1 is a view of an engine main body of an internal combustion engine to which a bearing device for a crankshaft according to the first embodiment is adopted. FIG. 1 schematically illustrates a section of an engine main body that is cut along a vertical surface passing through a center axis of the crankshaft. The engine of the present embodiment is a spark ignition type engine. The engine is loaded on a vehicle as a power source. An engine main body 1 of the engine includes a plurality of cylinders. FIG. 1 illustrates an example in which four cylinders are disposed in series, but the number of cylinders and arrangement of the cylinders are not limited.

In the engine main body 1, a crankshaft 2 as an objective shaft is contained. A transmission not illustrated is connected to one end side of the crankshaft 2. The transmission may be an automatic transmission (AT) including a torque converter and a continuous variable transmission (CVT), or may be a transmission including a clutch. Note that in the following explanation, in the engine main body 1, a side where the transmission is provided is referred to as an "engine rear side", and a side where the transmission is not provided is referred to as an "engine front side".

Figure 2:
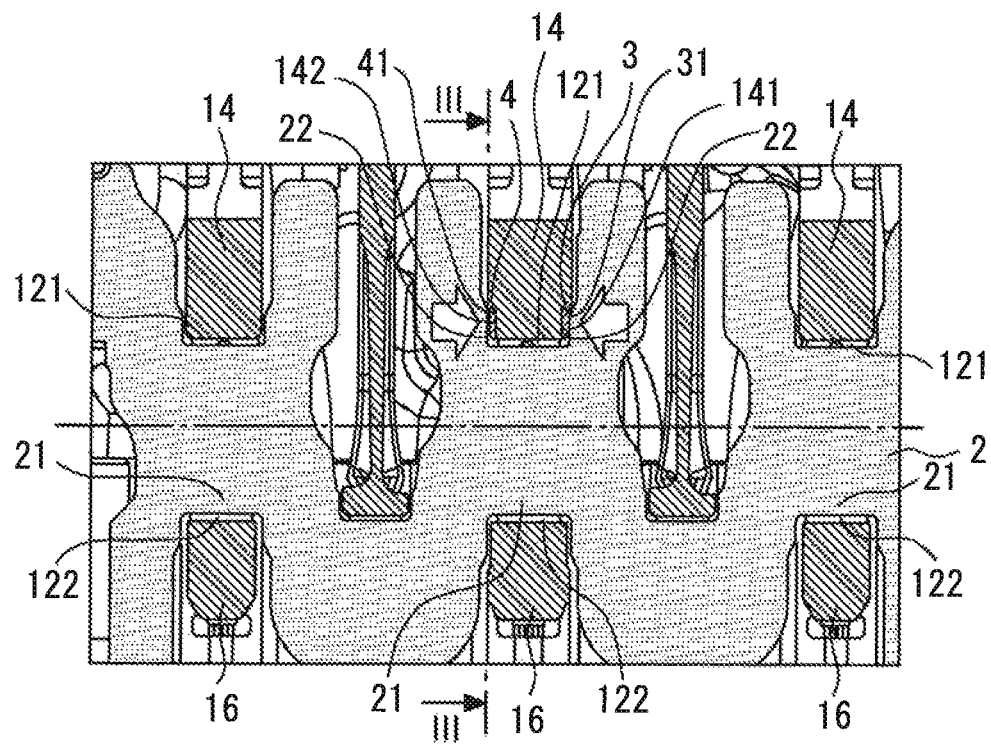
FIG. 2 is an enlarged view of a bearing portion II of the crankshaft in FIG. 1.
Figure 3:
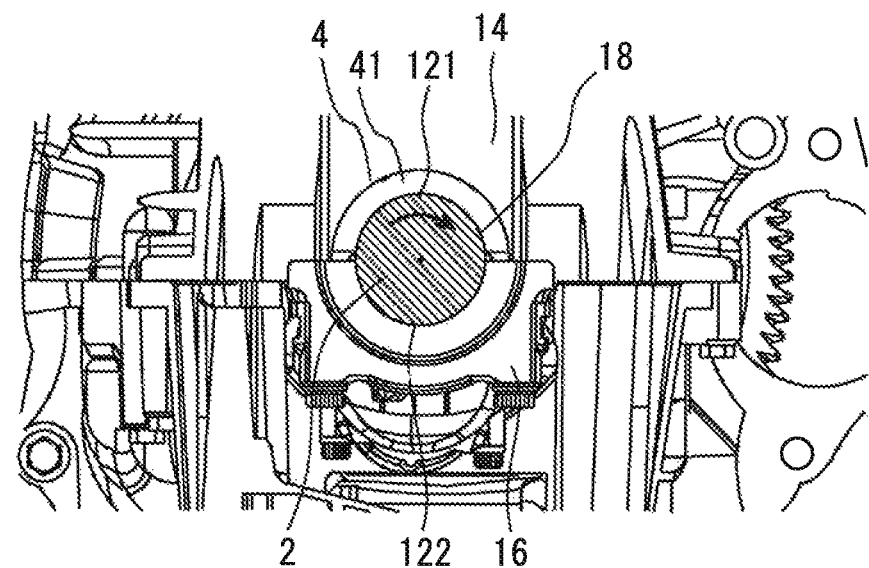
FIG. 3 is a schematic view of the bearing portion in FIG. 2 cut along a line III-III in FIG. 2 and seen from an axial direction of the crankshaft.

FIG. 2 is an enlarged view of a bearing portion II of the crankshaft in FIG. 1. Further, FIG. 3 is a schematic view of the bearing portion in FIG. 2 cut along a line III-III in FIG. 2 and seen from an axial direction of the crankshaft. Hereinafter, with reference to FIGS. 2 and 3, a bearing device for the crankshaft 2 will be described in more detail. As illustrated in FIG. 2, the crankshaft 2 is rotatably supported by sliding bearings 121 and 122 that are disposed in a bearing hole 18 that penetrates through both side surfaces of a bearing support portion. The sliding bearings 121 and 122 are bearings for receiving a force in a radial direction of the crankshaft, and are configured as a pair of half-split type bearings obtained by splitting a cylindrical component into two by a plane including an axis of the component. The sliding bearings 121 and 122 are respectively installed in a saddle portion 14 and a cap portion 16 as bearing support portions. The saddle portion 14 is a structure configured at an engine block side of the engine main body 1, and the cap portion 16 is a structure configured as a separate component from the engine block of the engine main body 1. The cap portion 16 is fixed to the saddle portion 14, and thereby the bearing hole 18 in which the sliding bearings 121 and 122 are disposed is formed.

A bearing seat 141 is provided on a side surface that faces an engine rear side (that is, a side of the transmission) out of two side surfaces of the saddle portion 14 located between the second cylinder and the third cylinder. Further, a bearing seat 142 is provided on a side surface that faces an engine front side (that is, an opposite side from the transmission) out of the two side surfaces of the saddle portion 14. The bearing seats 141 and 142 are recessed portions for positioning thrust bearings 3 and 4, and are provided at the circumferential edge of the bearing hole 18. The thrust bearings 3 and 4 are configured as bearings in half-split circular ring shapes which are obtained by splitting a circular ring-shaped component having 2 mm thickness into two by a plane including an axis of the component. The thrust bearings 3 and 4 are respectively disposed on the bearing seats 141 and 142 so that slide surfaces 31 and 41 in half-split circular ring shapes face a slide surface 22 of the crankshaft 2. The slide surface 22 is a ring-shaped plane provided at both ends of a journal 21. A bearing clearance is formed by an oil film of the lubricating oil between the slide surface 22 of the crankshaft 2 and the slide surface 31, 41 of the thrust bearing 3, 4. When the crankshaft 2 rotates, the slide surface 22 slides with respect to the slide surfaces 31 and 41 across the oil film. According to the configuration like this, the thrust bearings 3 and 4 bear a thrust load in the axial direction that occurs to the crankshaft 2 by the slide surfaces 31 and 41.

2. Configuration of Thrust Bearing

Figure 4:
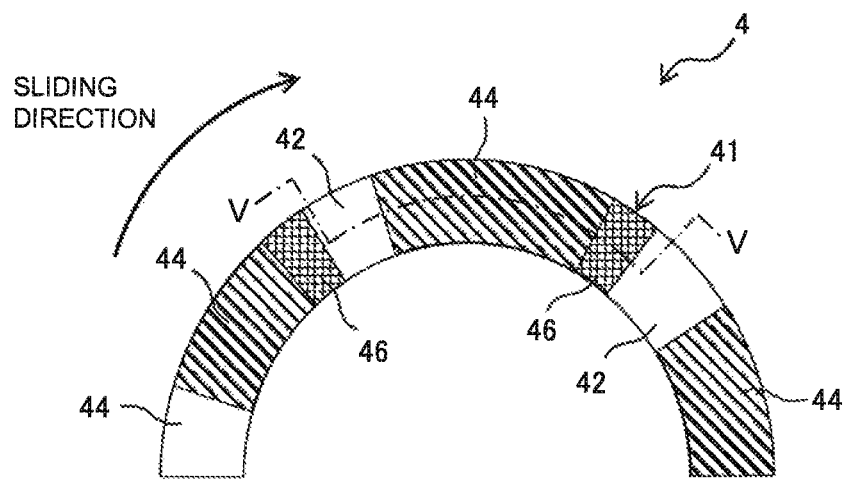
FIG. 4 illustrates a configuration of the thrust bearing.
Figure 5:
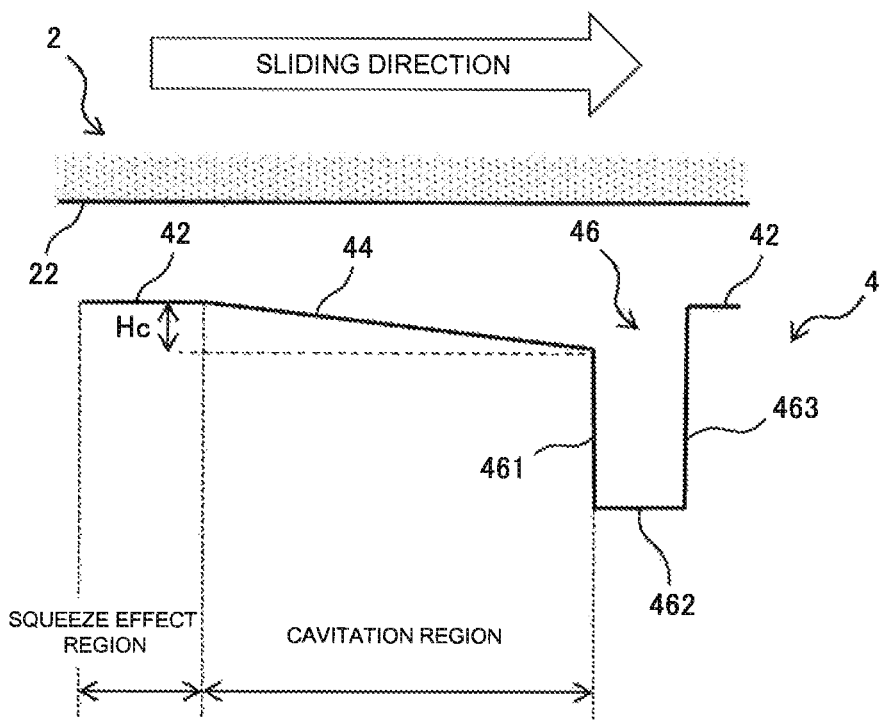
FIG. 5 is a diagram illustrating a cross-sectional shape in the case where the bearing is cut along the curved line V-V in FIG. 4.

Next, a configuration of the thrust bearing which is a feature of the bearing device of the first embodiment will be described. Note that the slide surface 31 of the thrust bearing 3 has a mirror image symmetrical shape with the slide surface 41 of the thrust bearing 4. Thus, in the following explanation, the specific shape of the thrust bearings 3, 4 will be described taking the thrust bearing 4 as an example. FIG. 4 illustrates a configuration of the thrust bearing. Further, FIG. 5 is a diagram illustrating a cross-sectional shape in the case where the bearing is cut along the curved line V-V in FIG. 4. The sliding direction shown in these drawings indicates a rotation direction of the slide surface 22 of the crankshaft 2 with respect to the slide surface 41. As shown in these drawings, on the slide surface 41 of the thrust bearing 4 of the first embodiment, a planar portion 42, a takeaway portion 44, and a pocket portion 46 are formed.

The planar portion 42 is formed by a plane where the wall thickness which is the bearing thickness is constant. Positive oil film pressure is generated in a bearing clearance of the planar portion 42. The planar portion 42 exerts the function to suppress the blur of the slide surface 22 due to the distortion of the crankshaft 2, due to the squeeze effect caused by this positive oil film pressure. Note that in the following explanation, the region where the planar portion 42 is formed in the slide surface 41 of the thrust bearing 4 is referred to as a "squeeze effect region".

The taper portion 44 includes a flat tapered surface inclined so that the wall thickness gradually becomes thinner from the end of the planar portion 42 toward the sliding direction of the slide surface 22 of the crankshaft 2. In the bearing clearance of the taper portion 44, negative oil film pressure is generated by attracting the lubricating oil.

Here, cavitation occurs in the slide surface where the negative pressure occurred. The fluid viscosity $\eta$ of lubricating oil is on the order of $\eta=1$ to 100 mPas, while the fluid viscosity $\eta$ of air is on the order of $\eta=0.01$ to 0.1 mPas. That is, the fluid viscosity $\eta$ of air is much smaller than the fluid viscosity $\eta$ of lubricating oil. As represented by the following equation (1), the shear resistance $\tau$ of fluid is proportional to the fluid viscosity $\eta$ and the slipping velocity U and inversely proportional to the film thickness h of the oil film. Thus, when cavitation occurs in the oil film of the bearing clearance, the shear resistance $\tau$ of the oil film decreases, thereby reducing sliding friction. In the following explanation, the area of the slide bearing 41 of the thrust bearing 4 where the taper portion 44 is formed is referred to as a "cavitation region". Further, the depth Hc of the taper portion 44 expressed by the difference between the wall thickness of the thickest portion of the taper portion 44 and the thinnest portion of the taper portion 44 is referred to as a "cavitation region depth".

$$\tau = \frac{\eta U}{h} \tag{1}$$

Further, the pocket portion 46 includes a bottom surface 462, a first side surface 461, and a second side surface 463. The bottom surface 462 is configured so that the wall thickness becomes thinner than the thinnest portion of the taper portion 44. The first side surface 461 is configured on the side of the taper portion 44. The second side surface 463 is formed on the side facing the first side surface 461. Lubricating oil flows into the pocket portion 46 from the taper portion 44. Thereby, the pocket portion 46 exhibits the function of capturing the foreign matter attracted to the taper portion 44. On the slide surface 41, a plurality of series of structures including the planar portion 42, the taper portion 44 and the pocket portion 46 are continuously formed.

3. Features of Thrust Bearing

The inventors of the present application have repeatedly conducted the movement of the lubricating oil flowing through the slide surface 41 of the thrust bearing 4. As a result, the inventors have found the optimum shape of the taper portion 44 for maximizing the effect of cavitation occurrence without sacrificing the squeeze effect. Further, the inventors have found the optimum shape of the pocket portion 46 for effectively capturing the foreign matter attracted in the taper portion 44.

3-1. Features of Taper Portion

Figure 6:
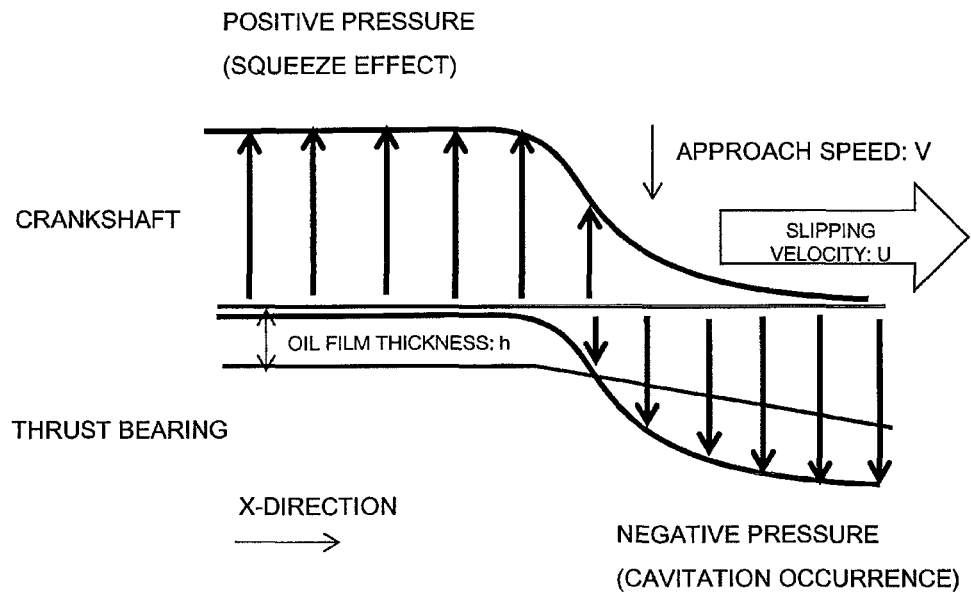
FIG. 6 is a diagram illustrating the distribution of oil film pressure occurring in the planar portion and the taper portion of the thrust bearing.

First, the optimum shape of the taper portion 44 will be described. FIG. 6 is a diagram illustrating the distribution of oil film pressure occurring in the planar portion and the taper portion of the thrust bearing. As shown in the drawing, the planar portion 42 of the thrust bearing 4 affects the occurrence of squeeze effect due to positive pressure. In contrast, the taper portion 44 of the thrust bearing 4 has an influence on the occurrence of cavitation due to negative pressure. The thrust bearing 4 is required to demonstrate these two effects in a balanced manner so as to reduce the sliding friction while supporting the thrust load from the crankshaft 2.

Figure 7:
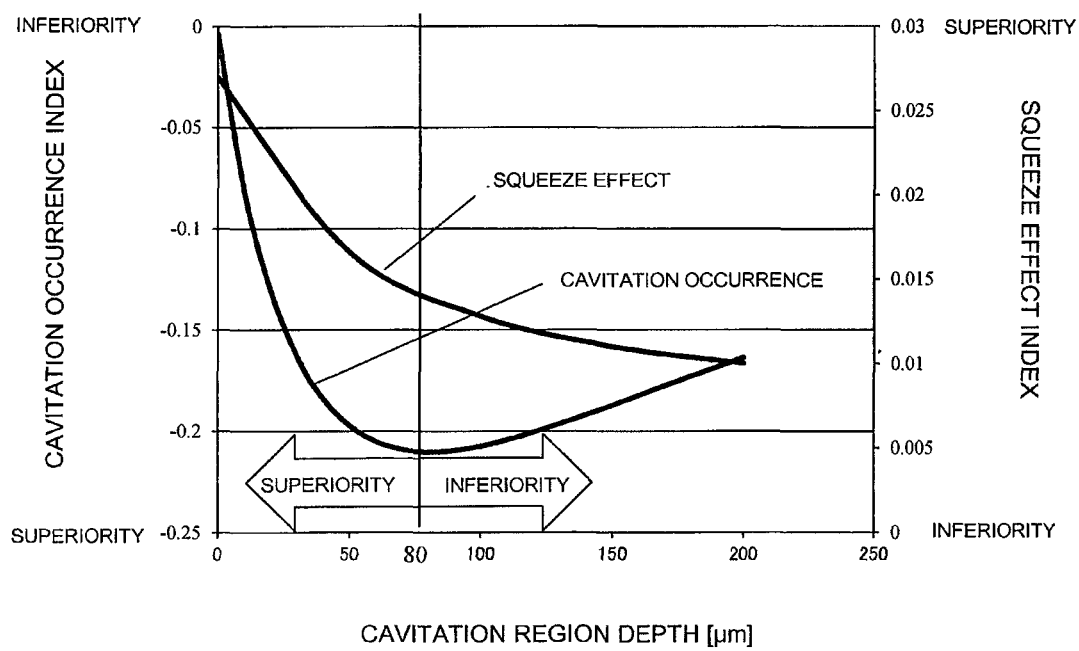
FIG. 7 is a graph illustrating an example of a verification result showing a squeeze effect index and a cavitation occurrence index with respect to a cavitation region depth.

FIG. 7 is a graph illustrating an example of a verification result showing a squeeze effect index and a cavitation occurrence index with respect to a cavitation region depth. The squeeze effect index is an index for judging the superiority or inferiority of the bearing function based on the squeeze effect, and is calculated by the following expression (2), for example. The cavitation occurrence index is an index for judging the superiority or inferiority of the sliding friction reduction function by cavitation occurrence, and is calculated by the following expression (3), for example. In the following equations (2) and (3), "p" represents an oil film pressure, "x" represents a coordinates in the sliding direction, "$\eta$" represents a viscosity of oil film, "U" represents a slipping velocity of the crankshaft 2, "h" represents an oil film thickness and "V" represents an approach speed of the crankshaft 2 to the thrust bearing 4.

$$\frac{d^2 p}{dx^2} = \frac{6\eta U}{h^3} \frac{dh}{dx} \tag{2}$$

$$\frac{d^2 p}{dx^2} = \frac{6\eta}{h^3} V \tag{3}$$

According to the verification result shown in FIG. 7, the squeeze effect index is most dominant in the case where the cavitation region depth is 0, and the deeper the cavitation region depth is, the more inferior the squeeze effect index becomes. In contrast, the cavitation occurrence index is most inferior in the case where the cavitation region depth is 0. Further, and becomes most dominant in the case where the cavitation region depth is 80 μm. Further, the deeper the cavitation region depth is, the more inferior the cavitation occurrence index becomes.

As described above, according to the verification result shown in FIG. 7, the cavitation region depth is preferably as small as possible from the viewpoint of the squeeze effect, and is preferably around 80 μm from the viewpoint of the effect of the cavitation occurrence. However, in the case where the cavitation region depth is larger than 80 μm, the squeeze effect becomes inferior, and in the range where the cavitation region depth is less than 10 μm, the cavitation occurrence may not be expected to occur. Thus, in the thrust bearing 4 of Embodiment 1, the shape of the taper portion 44 is determined within the range that the cavitation occurrence is secured as much as possible and the squeeze effect is not damaged as much as possible. As such a range, the shape of the taper portion 44 may be determined so that the cavitation region depth is in the range of 10 μm to 80 μm.

3-2. Features of Pocket Portion

Figure 8:
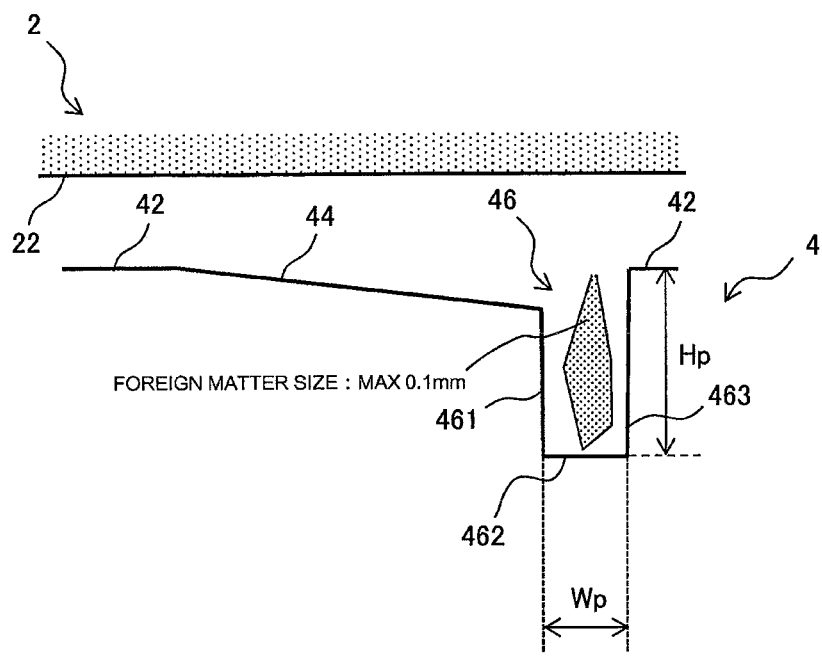
FIG. 8 is a diagram for describing the shape of a pocket portion of a thrust bearing.

Next, the shape of the pocket portion 46 will be described. FIG. 8 is a diagram for describing the shape of a pocket portion of a thrust bearing. Foreign matter may be attracted in the taper portion 44 with the lubricating oil. The foreign matter attracted in the taper portion 44 is captured in the pocket portion 46. Thus, it is preferable that the pocket portion 46 is determined to a size that prevents the foreign matter from touching the slide surface when capturing the assumed maximum foreign matter. The following equation (4) shows a condition for preventing the foreign matter captured by the pocket portion 46 from touching the slide surface 22 of the crankshaft 2. A pocket depth Hp is defined by the height from the bottom surface 462 to the planar portion 42 of the pocket portion 46. The pocket depth Hp is preferably determined within a range satisfying the condition of the following expression (4), for example. In the formula (4), "Ra" represents the surface roughness [mm] of the slide surface 22 of the crankshaft 2, "Rb" represents the surface roughness [mm] of the slide surface 41 of the thrust bearing 4, and "ha" represents the size [mm] of foreign matter.

$$Hp \geq \sqrt{Ra^2 + Rb^2 + ha^2} \quad (4)$$

For example, assuming that Ra is 0.0005 mm and Rb is 0.001 mm, the terms of Ra and Rb in the formula (4) are negligibly small. For this reason, the pocket depth Hp has only to satisfy Hp≥ha. Thus, assuming that the foreign matter size ha is 0.1 mm at the maximum, the pocket depth Hp is preferably determined to be 0.1 mm or more. In the thrust bearing 4 of Embodiment 1, considering that the pocket portion 46 also functions as an oil groove, the pocket depth Hp is determined to be about 0.8 mm to 1.2 mm, and the pocket width Wp is determined to be about 2 mm to 3 mm.

3-3. Problems of Shape of Pocket Portion

Even if the pocket portion 46 secures the pocket depth Hp, depending on the shape of the first side surface 461 and the second side surface 463, the captured foreign matter may returns to the taper portion 44 or the planar portion 42 again. Thus, in the thrust bearing 4 of Embodiment 1, the inclination angle of the first side surface 461 and the second side surface 463 is prescribed to prevent return of foreign matters.

3-4. Features of Second Side Surface of Pocket Portion

Figure 9:
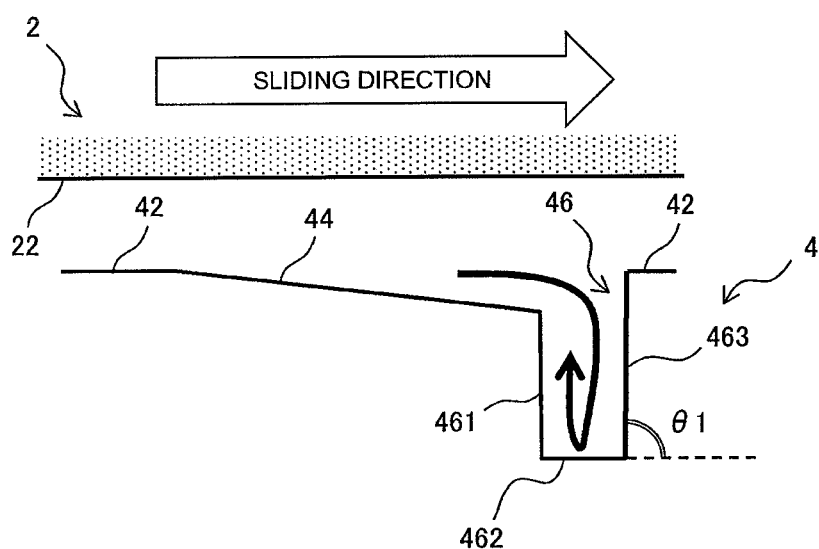
FIG. 9 is a diagram for describing the shape of the second side surface portion of the pocket portion.
Figure 10:
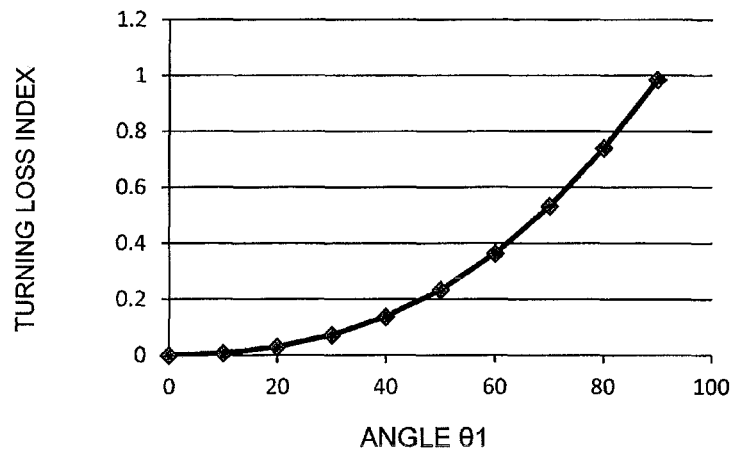
FIG. 10 is a graph illustrating the change in the turning loss index with respect to the first angle θ1 of the lubricating oil flowing into the pocket portion.

FIG. 9 is a diagram for describing the shape of the second side surface portion of the pocket portion. As shown in the drawing, the first angle θ1 formed by the virtual surface extending the bottom surface 462 and the second side surface 463 affects the turning loss index of the lubricating oil flowing into the pocket portion 46. FIG. 10 is a graph illustrating the change in the turning loss index with respect to the first angle θ1 of the lubricating oil flowing into the pocket portion. As shown in this drawing, the turning loss of lubricating oil flowing into the pocket portion 46 tends to increase as the first angle θ1 is larger. However, if the first angle θ1 is increased beyond 90°, there is concern about durability and workability due to the acute angle formed by the second side surface 463 and the planar portion 42. Thus, in the thrust bearing 4 of Embodiment 1, the first angle θ1 is determined as a range of 90°≤θ1≤120° as the configuration of the second side surface 463 for preventing return of foreign matters. In view of durability and processability, the first angle θ1 is more preferably in the range of 90°≤θ1≤100°, and is particularly preferably θ1=90.

3-5. Features of First Side Surface of Pocket Portion

Figure 11:
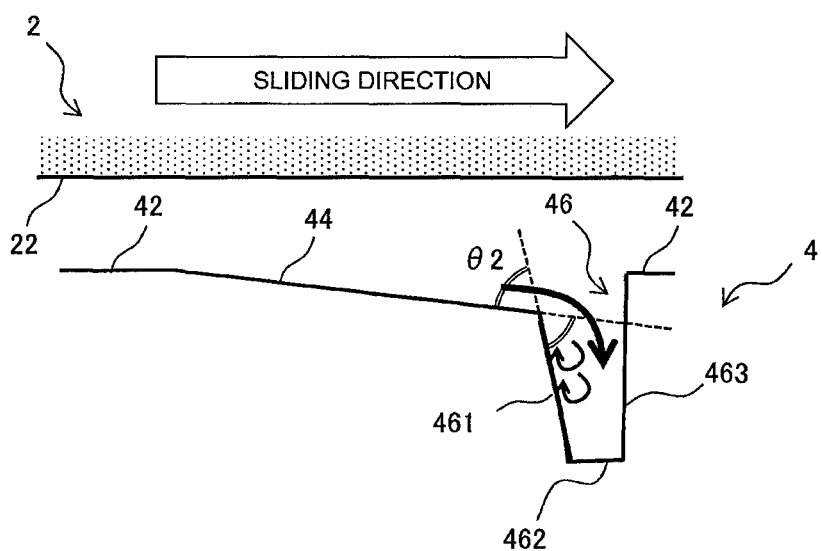
FIG. 11 is a diagram for describing a shape of the first side surface of the pocket portion.

FIG. 11 is a diagram for describing a shape of the first side surface of the pocket portion. When the lubricating oil flows into the pocket portion 46, a turbulent flow accompanying separation occurs on the side of the first side surface 461 inside the pocket portion 46 due to the resistance to bending of the fluid. When a turbulent flow occurs inside the pocket portion 46, oil flow returning from the inside of the pocket portion 46 to the taper portion 44 is hindered. The second angle θ2 formed by the imaginary surface extending the tapered surface of the taper portion 44 and the first side surface 461 affects the degree of occurrence of this turbulent flow. Thus, by determining the second angle θ2 so as to activate generation of turbulence as much as possible, it is possible to prevent the return of foreign matter captured by the pocket portion 46.

Figure 12:
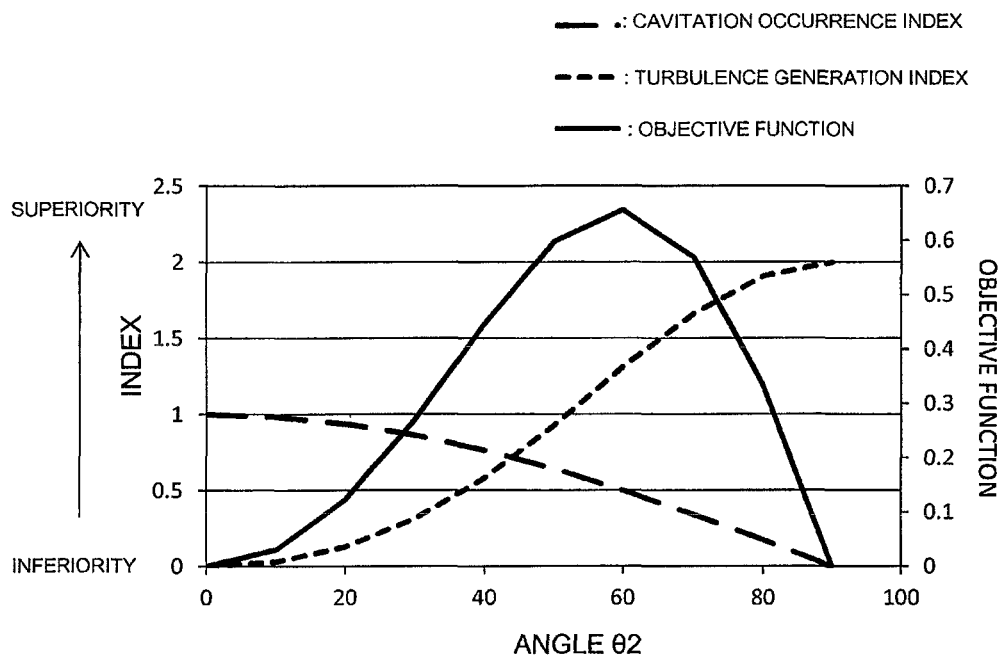
FIG. 12 is a graph illustrating an example of a verification result showing a cavitation occurrence index and a turbulence generation index for the second angle θ2.

FIG. 12 is a graph illustrating an example of a verification result showing a cavitation occurrence index and a turbulence generation index for the second angle θ2. As shown in this drawing, the turbulence generation index in the pocket portion 46 tends to dominate as the second angle θ2 is larger. Thus, in order to activate the generation of the turbulent flow, it is preferable to determine the second angle θ2 to a range of, for example, 90° or more.

However, the second angle θ2 affects not only the occurrence of turbulence but also the attraction effect of foreign matter due to negative pressure. As shown in FIG. 12, the cavitation occurrence index shows a tendency to become inferior as the second angle θ2 is larger. According to the results of this verification, if the negative pressure accompanied by occurrence of cavitation is occurring, the attraction effect of foreign matter may be expected even if the second angle θ2 is smaller than 90°. The solid line shown in FIG. 12 shows the objective function obtained by multiplying the cavitation occurrence index and the turbulence generation index. This objective function shows that in the case where the second angle θ2 is 60°, the overall effect obtained from attraction of foreign matter by negative pressure and occurrence of turbulence is maximized.

In the thrust bearing 4 of Embodiment 1, as the configuration of the first side surface 461 for promoting the attraction of foreign matter while preventing the return of foreign matter, the second angle θ2 is determined within the range of 60°≤θ2≤120°. In view of durability and processability, the second angle θ2 is preferably in the range of 90°≤θ2≤100°, and is particularly preferably θ2=90°.

According to the configuration of the pocket portion 46 described above, it is possible to capture the foreign matter attracted to the taper portion 44 by the negative pressure and to prevent the foreign matter from returning to the taper portion 44 again. As described above, according to the thrust bearing 4 and the bearing device of the first embodiment, it is possible to improve foreign matter dischargeability while reducing sliding friction loss by simultaneously achieving the squeeze effect, the occurrence of cavitation, and the effect of trapping foreign matter.

4. Modified Example of Structure of Bearing Device

For example, the bearing device of the first embodiment may employ a configuration modified as follows.

Figure 13:
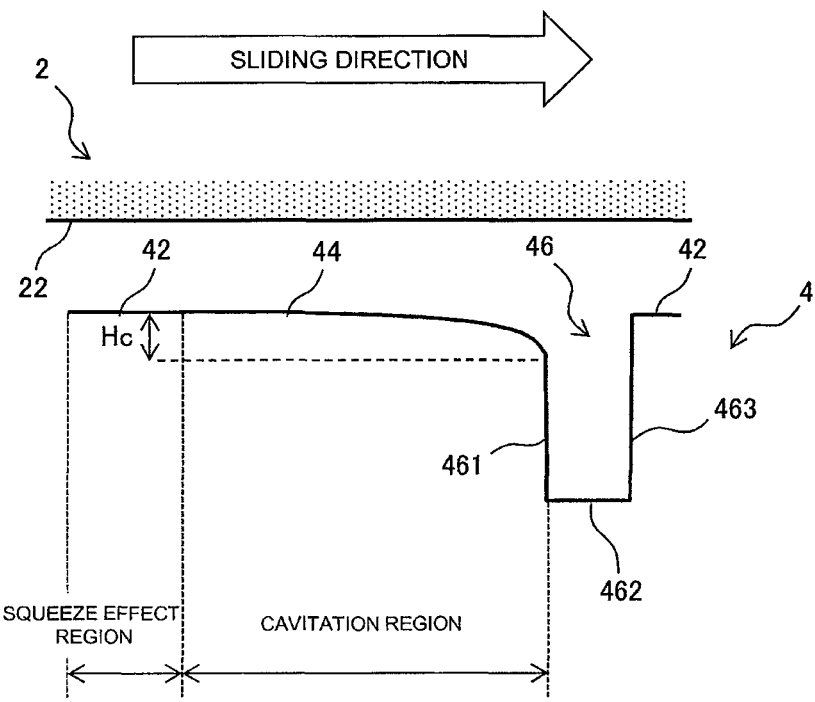
FIG. 13 is a diagram illustrating a modified example of a structure of the thrust bearing.

FIG. 13 is a diagram illustrating a modified example of a structure of the thrust bearing. In the example illustrated in the drawing, the taper portion 44 of the thrust bearing 4 including the cavitation area does not have to change the bearing clearance linearly. That is, the taper portion 44 may include such a surface that the bearing clearance gradually narrows as going to the sliding direction. For example, as shown in FIG. 13, it may include a curved surface which is convex upward, or it may include a curved surface which is convex downward.

Figure 14:
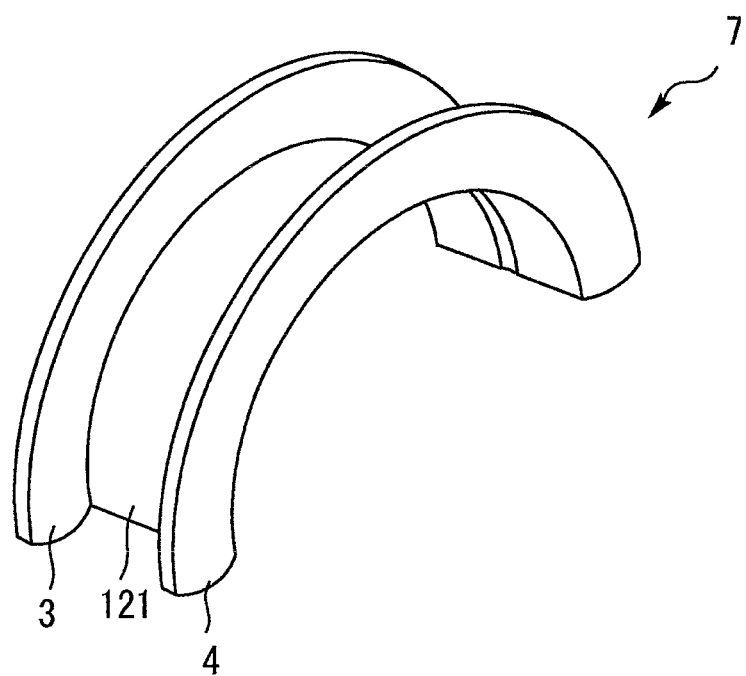
FIG. 14 is a diagram illustrating a modified example of a structure of the bearing device.

FIG. 14 is a diagram illustrating a modified example of a structure of the bearing device. In the example illustrated in the drawing, the bearing device is configured as a flange bearing 7 in which the thrust bearings 3 and 4 are integrated with the sliding bearing 121. According to the structure of the bearing device like this, the number of components can be reduced.

The thrust bearings 3 and 4 may be provided on both side surfaces of the cap portion 16 in place of the saddle portion 14 or in addition to the saddle portion 14.

What is claimed is:

1. A thrust bearing having a slide surface in a circular ring shape or a half-split circular ring shape, the thrust bearing comprising:
   a planar portion having a plane on the slide surface where a wall thickness is constant;
   a taper portion having a tapered surface on the slide surface where a wall thickness gradually decreases from an end portion of the planar portion toward a prescribed sliding direction; and
   a pocket portion on the slide surface, the pocket portion comprising:
      a bottom surface in which a wall thickness is thinner than a thinnest portion of the taper portion;
      a first side surface formed on the side of the taper portion; and
      a second side surface formed on a side opposed to the first side surface,
   wherein the planar portion, the taper portion and the pocket portion are disposed in order along the sliding direction on the slide surface,
   wherein a depth from the plane of the planar portion to the thinnest portion of the taper portion is between 10 μm and 80 μm,
   wherein a first angle that is an angle between a virtual surface obtained by extending the bottom surface and the second side surface is between 90° and 120°, and a second angle that is an angle between a virtual surface obtained by extending the first side surface and the tapered surface is between 60° and 120°.

2. The thrust bearing according to claim 1, wherein a plurality of structures including the planar portion, the taper portion and the pocket portion are disposed continuously on the slide surface.

3. The thrust bearing according to claim 1, wherein a depth from the plane of the planar portion to the bottom surface of the pocket portion is 0.1 mm or more.

4. The thrust bearing according to claim 1, wherein the thrust bearing is configured as a flange bearing configured to be integrated with a sliding bearing that receives a force in a radial direction of a shaft.

5. A bearing device configured to support a crankshaft of an internal combustion engine, the device comprising:
   a bearing support portion having a bearing hole and a bearing seat around the bearing hole and supporting a journal of the crankshaft by the bearing hole; and
   a thrust bearing according to claim 1,
   wherein the thrust bearing is disposed on the bearing seat in such a direction that a rotation direction of the crankshaft coincides with a prescribed sliding direction of the thrust bearing.

6. The bearing device according to claim 5, wherein the bottom surface extends continuously from the first side surface to the second side surface.

7. The thrust bearing according to claim 1, wherein the bottom surface extends continuously from the first side surface to the second side surface.

* * * * *